United States Patent

[11] 3,623,041

[72] Inventor David L. MacDougall, Jr.
San Jose, Calif.
[21] Appl. No. 843,522
[22] Filed July 22, 1969
[45] Patented Nov. 23, 1971
[73] Assignee International Business Machines Corporation
Armonk, N.Y.

[54] METHOD AND APPARATUS FOR ENCODING AND DECODING DIGITAL DATA
10 Claims, 55 Drawing Figs.

[52] U.S. Cl. 340/174.1G, 340/174.1 B, 340/174.1 H, 340/347 DD
[51] Int. Cl. G06f 5/00, G11b 5/06
[50] Field of Search 340/347, 174.1; 235/154 B, 154 G, 154 H; 346/74 M

[56] References Cited

UNITED STATES PATENTS

| | | | |
|---|---|---|---|
| 3,374,475 | 3/1968 | Gabor | 346/74 X |
| 3,482,228 | 12/1969 | Decker | 340/174.1 |
| 3,488,662 | 1/1970 | Vallee | 346/74 |
| 3,488,663 | 1/1970 | Rosenblatt | 346/74 |

OTHER REFERENCES

R. Franchini, " A Modified Technique of MFM Recording," IBM Technical Disclosure Bull., Vol. 10, No. 2; July, 1967, p. 112.

R. Franchini et al., " Data Encoding Circuit," IBM Technical Disclosure Bull., Vol. 11, No. 5; October, 1968, pp. 470–471.

A. Hoagland, Digital Magnetic Recording, 1963, pp. 112–125.

*Primary Examiner*—Maynard R. Wilbur
*Assistant Examiner*—Michael K. Wolensky
*Attorney*—Fraser and Bogucki

ABSTRACT: Method and apparatus are disclosed for processing and storage of binary information on a medium having two separately identifiable levels or states and having a plurality of nearly uniform bit cells. Encoding is accomplished by writing a transition between the two states at the center of each bit cell representing a "one" unless the cell is preceded by a "zero one" and followed by a "zero." Transitions are written at the leading edges of bit cells which are to represent a "zero" if there is not a "one" or a "zero" written in the preceding cell or a "one" dropped in the preceding cell. In decoding, the data transitions detected at the centers of bit cells are separated as "ones" while bit cells having a transition at the leading edge thereof are considered to represent "-zero." Bit cells which do not have a transition either at the center thereof or at the leading edge thereof are determined to represent "zero" unless the immediately following bit cell is similarly absent a transition at the leading edge or center thereof, in which case a "one" is inserted into the first of the two bit cells absent any transitions.

INVENTOR.
DAVID L. MAC DOUGALL, JR.

BY Fraser and Bogucki
ATTORNEYS

INVENTOR.
DAVID L. MAC DOUGALL, JR.
BY
Fraser and Bogucki
ATTORNEYS

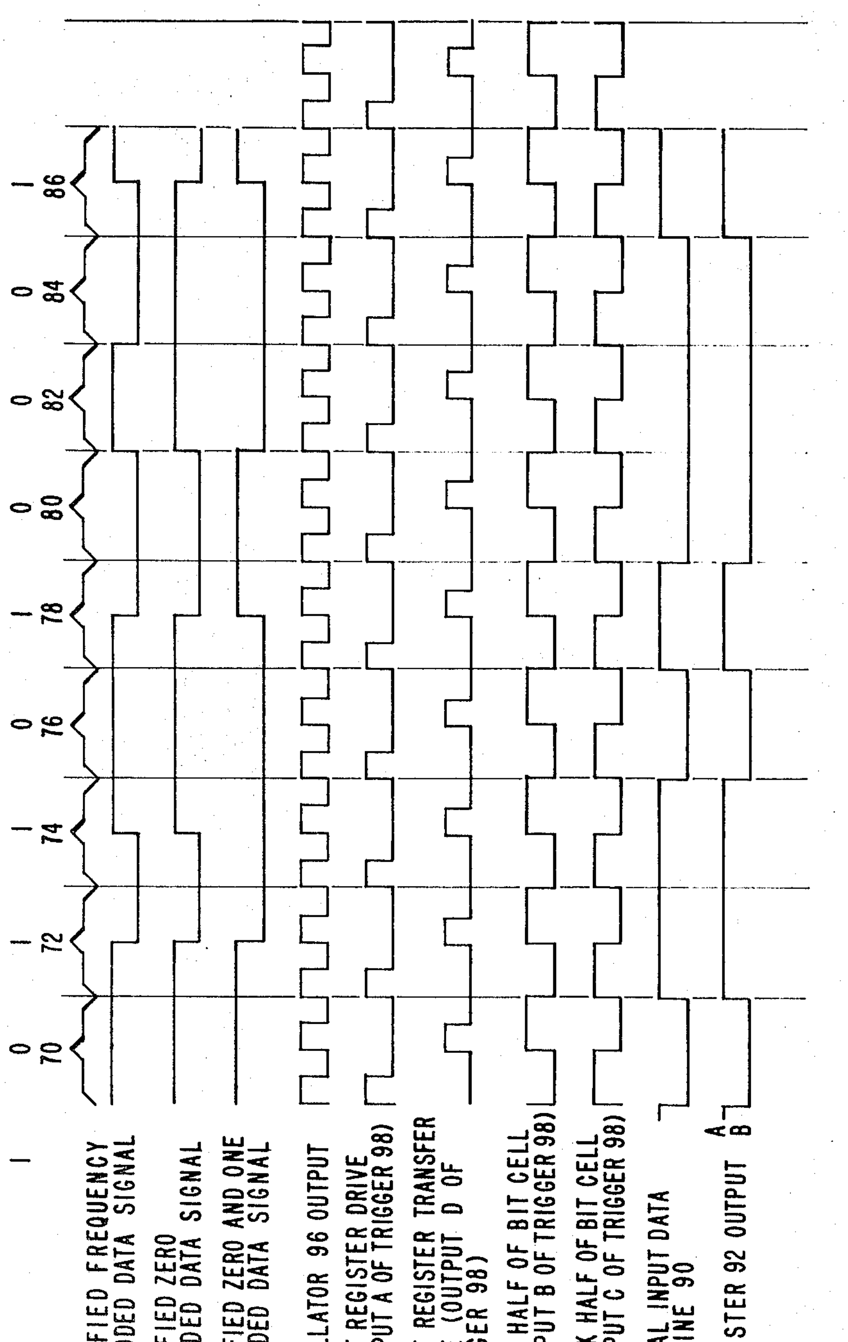

FIG. 3A MODIFIED FREQUENCY ENCODED DATA SIGNAL, FIG. 3B MODIFIED ZERO ENCODED DATA SIGNAL, FIG. 3C MODIFIED ZERO AND ONE ENCODED DATA SIGNAL, FIG. 3D OSCILLATOR 96 OUTPUT, FIG. 3E SHIFT REGISTER DRIVE (OUTPUT A OF TRIGGER 98), FIG. 3F SHIFT REGISTER TRANSFER DRIVE (OUTPUT D OF TRIGGER 98), FIG. 3G DATA HALF OF BIT CELL (OUTPUT B OF TRIGGER 98), FIG. 3H CLOCK HALF OF BIT CELL (OUTPUT C OF TRIGGER 98), FIG. 3I SERIAL INPUT DATA ON LINE 90, FIG. 3J REGISTER 92 OUTPUT

INVENTOR.
DAVID L. MAC DOUGALL, JR
BY
Fraser and Bogucki
ATTORNEYS

INVENTOR.
DAVID L. MAC DOUGALL, JR

BY *Fraser and Bogucki*

ATTORNEYS

INVENTOR.
DAVID L. MACDOUGALL, JR.
BY Fraser and Bogucki
ATTORNEYS

INVENTOR.
DAVID L. MACDOUGALL, JR.
BY
Fraser and Bogucki
ATTORNEYS

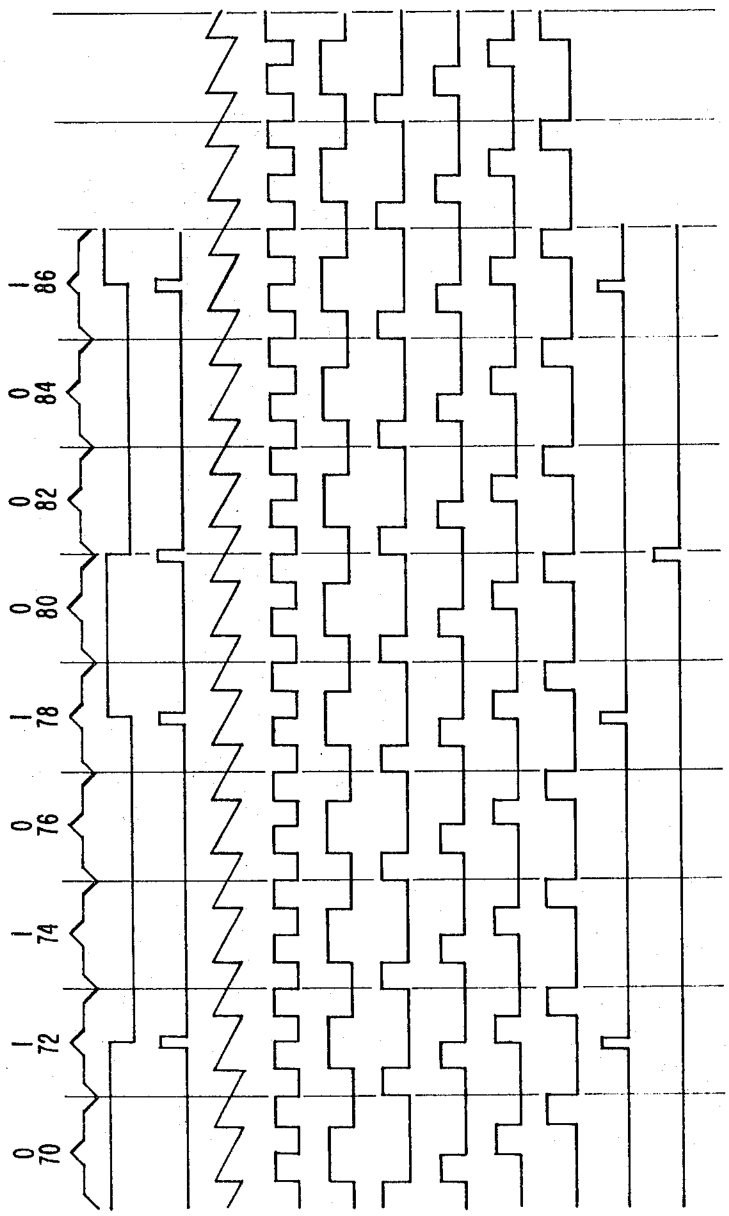
FIG. 5A RECORDED SIGNAL, FIG. 5B RAW DATA, FIG. 5C V.F.O. RAMP, FIG. 5D V.F.O. PULSE, FIG. 5E TRIGGER 210 "ON" OUTPUT, FIG. 5F OUTPUT OF FIRST CYCLE AND 214, FIG. 5G OUTPUT OF SECOND CYCLE AND 216, FIG. 5H OUTPUT OF THIRD CYCLE AND 218, FIG. 5I OUTPUT OF FOURTH CYCLE AND 220, FIG. 5J SEPARATED ONE PULSES, FIG. 5K SEPARATED ZERO PULSES
INVENTOR.
DAVID L. MAC DOUGALL, JR.
BY Fraser and Bogucki
ATTORNEYS

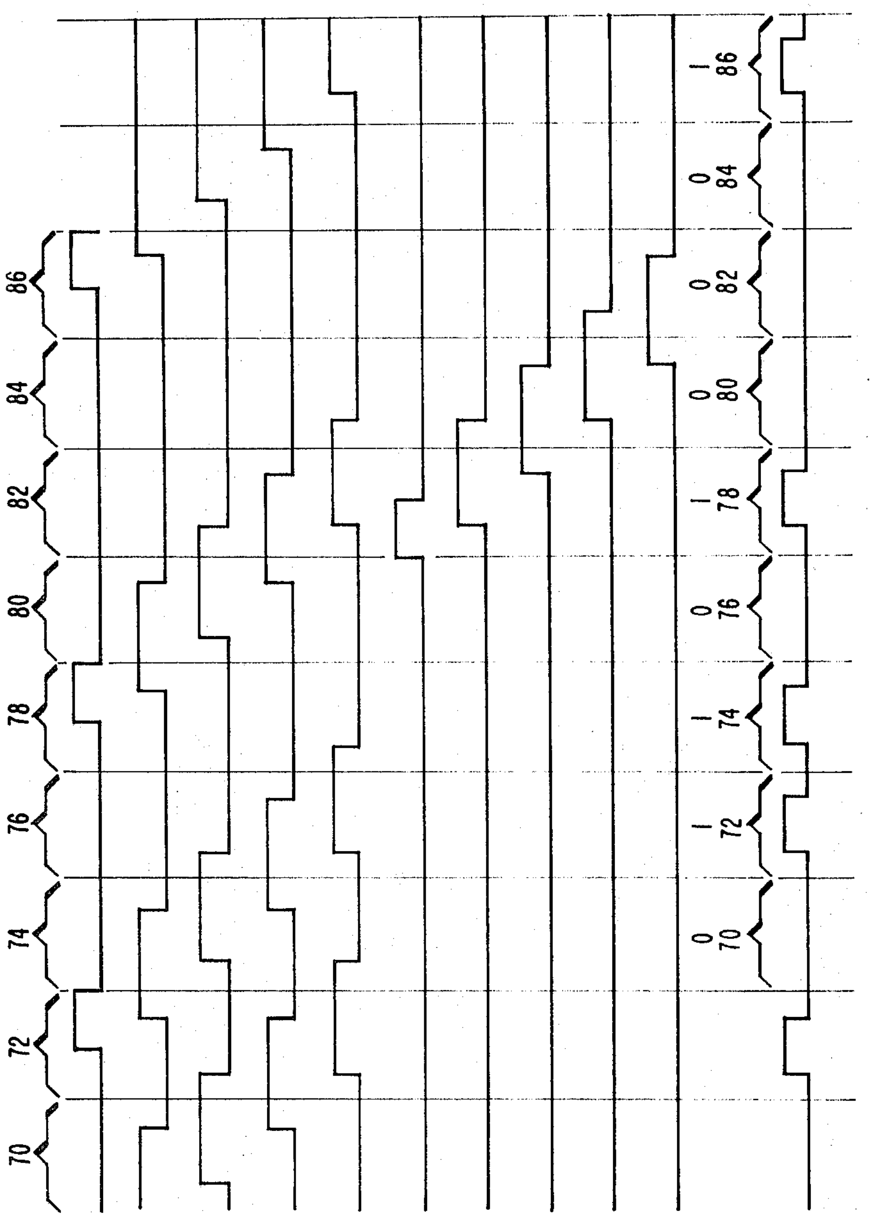

FIG. 5L OUTPUT OF FIRST DATA LATCH 230
FIG. 5M OUTPUT OF SECOND DATA LATCH 238
FIG. 5N OUTPUT OF THIRD DATA LATCH 240
FIG. 5O OUTPUT OF FOURTH DATA LATCH 246
FIG. 5P OUTPUT OF FIFTH DATA LATCH 252
FIG. 5Q OUTPUT OF FIRST CLOCK LATCH 232
FIG. 5R OUTPUT OF SECOND CLOCK LATCH 258
FIG. 5S OUTPUT OF THIRD CLOCK LATCH 264
FIG. 5T OUTPUT OF FOURTH CLOCK LATCH 266
FIG. 5U OUTPUT OF FIFTH CLOCK LATCH 268
FIG. 5V OUTPUT OF OR 282

INVENTOR.
DAVID L. MAC DOUGALL, JR.
BY Fraser and Bogucki
ATTORNEYS

METHOD AND APPARATUS FOR ENCODING AND DECODING DIGITAL DATA

BACKGROUND OF THE INVENTION

1. Field of the Invention

The present invention relates to methods and apparatus for encoding and decoding digital data, and more particularly to methods and apparatus for processing and detecting binary information on a medium exhibiting at least two separately identifiable states.

2. Description of the Prior Art

In pulse communication systems, such as radio or wire transmission of or data processing of digital information, the information signals may conveniently be represented in binary form wherein the signals comprise one or the other of two identifiable levels or states. Thus, common ways of representing the binary form of signals are as electrical on-off signals, dot-dash signals, or positive-negative signals.

For use in many communication and data processing systems, the binary information is represented by various combinations and/or timings of transitions between two stable states. This general type of representation is the nearly exclusive type employed for storage of binary information on magnetic tape or disks. The storage medium employed exhibits a hysteresis characteristic having two stable states comprising two directions of magnetic orientation of portions of the medium. A head effects writing on the medium by creating magnetic fields in one or the other of the two directions and switching the direction in accordance with the information to be written. Most such systems arbitrarily break up the recording medium into a plurality of imaginary equal-length portions, called bit cells, which serve as identifying boundaries for each binary bit (an individual "one" or "zero") of information. In communication systems, the bit cells are arbitrarily equal time periods.

Certain types of encoding, such as phase encoding, represent binary information by the direction of the transition between the two states at the center of each bit cell. Other types of encoding, such as "double-frequency" encoding, involve the writing of a binary "one" as two transitions within a bit cell, one at the leading edge and the other at the center. A binary "zero" is written as a single transition at the leading edge of the bit cell. Encoding of this type represents binary information by the number of transitions within a bit cell.

Both of these prior art encoding techniques require relatively high upper frequencies for a given amount of data. As the trend is toward higher efficiency in the packing of greater amounts of data into a limited space, such prior art techniques become severely limiting.

One encoding technique which has been found to reduce the high upper frequency required for a given amount of data is referred to as "modified FM" encoding. This type of encoding represents a "one" by a single transition at the midpoint of a bit cell and a "zero" by a single transition at the leading edge of a bit cell. To reduce the highest frequency to below that of phase encoding or double-frequency encoding, the recording of any transition is skipped in a "zero" bit cell if the immediate preceding cell contains a "one."

The modified FM representation of data by the exact position of a transition within a bit cell requires a very exact relationship between the timing of the data separation means and the incoming encoded data. The timing relationship is normally maintained by employing the transitions and continually adjusting the timing relationship so that the transitions are aligned with the timing of the bit cells of the separation means.

At high packing densities where the data bits are spaced relatively closely together, "bit shift" or "peak shift" adversely affects modified FM encoding. As magnetically recorded transitions are brought together, a magnetic head will detect both the transition over which it is passing, and the immediately preceding and following transitions, if they are close to the transition being read. Since the transitions alternate in sense or direction, detection of a preceding or following transition subtracts in amplitude from the transition being read. Moreover, if only one of the adjacent transitions is close to the transition being read, the subtraction is not symmetrical. Hence, the detection signal for the transition being read will be reduced only on one side, since the amount of subtraction is inversely dependent upon the distance between the transitions. The peak of the detection signal is thereby effectively shifted away from the closest adjacent transition.

Bit shift may have a disastrous effect upon the separation of modified FM information by self-clocking detection circuitry. For example, if a plurality of "ones" are followed by three or more "zeros," the first clock transition occurs 1½ bit cells after the last "one" transition and the next clock transition occurs only one bit cell later. The next clock will therefore effect a bit shift of the first clock transition encountered by the separation means after a series of "ones." The shifted clock bit may be erroneously detected as a data bit, and in such cases the self-clocking circuitry will erroneously determine that the detected bit is a late data bit rather than an early clock bit.

One encoding technique which is a variation of modified FM and which greatly minimizes bit shift in high-data-density situations is described in a copending application, Ser. No. 733,473, filed May 31, 1968, now U.S. Pat. No. 3,560,947 and assigned to the same assignee as the present invention. This technique is similar to modified FM, the difference being that clock transitions are not written at the leading edges of alternate bit cells in a string of "zeros." The resulting time intervals between adjacent clock transitions in a string of "zeros" is equal to twice the length of a bit cell, and bit shift of the clock transitions is greatly minimized, particularly in the case of the first and last clock transitions in a string of "zeros."

While the encoding technique in the above-referred-to copending application greatly minimizes the bit shift of the "-zero" or clock transitions, the problem remains that adjacent "ones" have transitions which are separated only by a distance equal to the length of a bit cell. Where a succession of three or more "ones" occurs, the data transitions comprising the opposite ends of the succession undergo some shifting away from the intervening "ones." Extensive shifting of such transitions however is prevented by the presence of the intervening "one" or data transitions. Where the pattern "zero one one zero" occurs, the two data transitions comprising the "ones" tend to undergo a rather substantial shifting.

BRIEF SUMMARY OF THE INVENTION

The present invention provides a method and apparatus for communicating binary information on a medium having two, separately identifiable states and divided into a plurality of bit cells of nearly uniform length, the information being represented by transitions between the states that are spaced apart so as to permit high packing densities with a minimum of bit shift. Data bits or "ones" are written at the center of a bit cell unless the cell is preceded by a "zero one" and followed by a "zero." Clock bits or "zeros" are written at the leading edge of a bit cell if a "one" or a "zero" is not written in the preceding cell and if a "one" has not been dropped in the preceding cell. During readout, a bit cell is determined to contain a "one" if a data bit is present at the center thereof, or if a clock or data bit is not within the cell and the immediately following bit cell does not contain a clock or data bit. Bit cells which have a clock bit written therein, or which have neither a clock bit nor a data bit and are immediately followed by a bit cell containing a data bit or a clock bit, are determined to contain a "zero."

In one preferred encoding arrangement in accordance with the invention, data to be encoded is serially advanced through a plurality of shift registers under the control of timing circuits which define a succession of bit cells for the data. The shift register output are applied to condition separate data and clock AND gates which are periodically strobed by the timing circuits to provide "one" and "zero" pulses to the output. The writing of alternate transitions in a succession of "zeros" is prevented by latching and AND circuits which are associated with the clock AND gate and which respond to the generation of each "zero" pulse to disable the clock AND gate during the following bit cell interval. Writing of the second "one" in the data pattern "zero one one zero" is prevented by circuitry which responds to the presence of the pattern "zero one one zero" in the shift registers to disable the data AND gate during the appropriate bit cell interval.

In a preferred detection arrangement for separating the data according to the invention, a variable-frequency oscillator in the form of a sawtooth or ramp generator is employed to generate a reference signal in synchronism with the incoming "one" and "zero" pulses. The reference signal is employed to operate gates which separate the "one" and "zero" pulses by directing the pulses to separate "data" and "clock" shift registers respectively. The shift registers are advanced under the control of the variable frequency oscillator to pass the separated "ones" and "zeros" to the output. The missing second "one" in the "zero one one zero" pattern is inserted by circuitry which responds to the shift register outputs whenever the pattern "zero one one zero" is present therein.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIGS. 3A through 3U are waveforms useful in explaining the operation of the arrangement of FIG. 2;

FIGS. 5A through 5V are waveforms useful in explaining the operation of the arrangement of FIG. 4.

DETAILED DESCRIPTION

The peak shift problems which result from relatively densely packed data and the manner in which the present invention alleviates such problems may be better understood by first considering the nature of the information signals as typically derived from a communication medium. FIGS. 1A through 1F illustrate various recordings such as might exist on a magnetic recording medium to represent certain data patterns and the corresponding signals which are derived from the recording such as by a magnetic read head. It is assumed that the magnetic recording medium exhibits a hysteresis characteristic having two stable states of remanence, and that binary data are recorded by writing transitions between the two states of remanence on the recording medium at selected locations within a succession of bit cells.

Figures 1A, 1B:
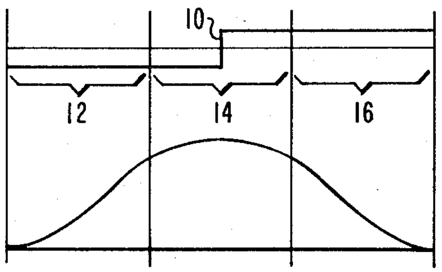
FIGS. 1A through 1F are waveforms useful in explaining the peak shift problems present when certain data patterns are detected.

FIG. 1A shows a single transition 10 at the midpoint of the second one of three bit cells 12, 14 and 16, and FIG. 1B shows the resulting signal as generated by a magnetic read head undergoing motion relative to the magnetic recording medium. The derived signal is not confined to a region immediately adjacent the transition 10 but rather extends over a considerable length of the recording track comprising approximately three bit cells. The peak of the signal waveform however coincides with the location of the transition 10, and if properly detected provides an accurate representation of the location of the transition.

The signal waveform shown in FIG. 1B is somewhat idealized in the sense that signal waveforms from transitions adjacent the transition 10 do not extend into any of the bit cells 12, 14 and 16. In actual practice however signal waveforms from adjacent transitions overlap and are subtractively combined to form a combined waveform substantially different from the contributing waveforms. As will be seen from the discussion of FIGS. 1C through 1F below, the peaks of the combined waveforms are normally shifted slightly any may be shifted to a considerable extent where adjacent transitions are relatively close together.

Figures 1C, 1D:
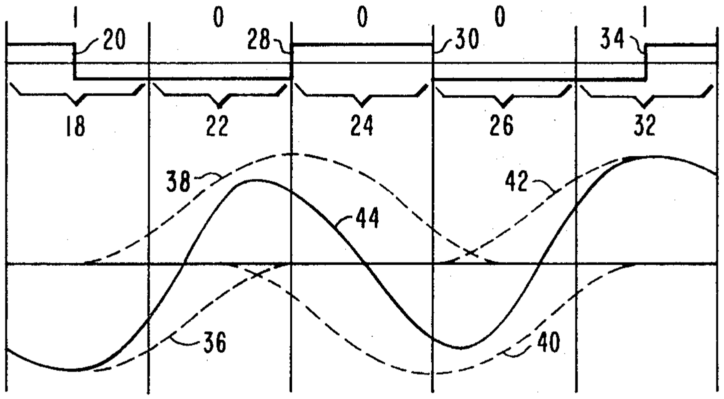

FIG. 1C illustrates a magnetic recording over a succession of five bit cells to represent the data pattern "one zero zero zero one." The data has been recorded using modified FM which, as previously mentioned, involves the writing of a data transition at the midpoint of each bit cell representing a "one" and the writing of a clock transition at the leading edge of each bit cell representing a "zero" except where the cell is immediately preceded by a "one" cell. Thus, the "one" in the first bit cell 18 is represented by a data transition 20 at the midpoint thereof. No transition is written at the lading edge of the following "zero" bit cell 22 however, since the cell 22 is immediately preceded by a "one" cell. The following cells 24 and 26 have clock transitions 28 and 30 at the leading edges thereof, and the "one" cell 32 has a data transition 34 at the midpoint thereof.

If each of the transitions 20, 28, 30 and 34 could be sensed by a read head independent of the other transitions, a signal waveform similar to that shown in FIG. 1B would be generated in each case, the waveforms corresponding to the transitions 20, 28, 30 and 34 being shown in dashed outline and labeled 36, 38, 40 and 42, respectively. In actual practice, however, the read head senses the total flux emanating from the combination of the transitions as it passes over the magnetic recording medium so as to provide the combined signal waveform 44 shown in solid outline in FIG. 1D.

The waveform 44 is assumed to represent the transition 20 within the bit cell 18 without any interference from a transition which may occur to the left thereof. Similarly, the waveform 44 within the last bit cell 32 is assumed to represent the transition 34 without any interference from an adjacent transition to the right thereof. In the case of the transition 20, the influence from the signal waveform 38 derived from the following transition 28 spaced a distance of 1½ bit cells therefrom is negligible at the midpoint of the bit cell 18, and the peak of the combined waveform 44 occurs virtually at the midpoint of bit cell 18 in coincidence with the transition 20. Similarly, in the case of the last bit cell 32, the influence of the signal waveform 40 derived from the transition 30 which precedes the transition 34 by a distance equal to 1½ bit cells is negligible at the midpoint of the bit cell 32, and the corresponding peak of the combined waveform 44 occurs virtually at the midpoint. Problems arise, however, in the case of the transitions 28 and 30 which are spaced apart only by a distance equal to one bit cell. While the signal waveforms 36 and 42 from the transition 20 and 34 have practically no effect on the transition 28 and 30, the signal waveforms 38 and 40 derived from the transitions 28 and 30 interfere with one another due to their close proximity resulting in the shifting of the corresponding peaks of the combined signal waveform 44. Thus, the waveform 40 from the transition 30 subtracts from the waveform 38 so as to shift the corresponding peak to the left by a considerable distance. The waveform 38 likewise subtracts from the negative waveform 40 shifting the resulting peak corresponding to the transition 30 a considerable distance to the right. It will be noted that in each case the peaks are illustrated as being shifted from their desired location by a distance approximately equal to one-quarter the length of a bit cell. In actual practice, the amount of peak shift may be greater or less depending upon the characteristics of the particular read head being used.

Extensive peak shift is undesirable for a number of reasons. Where the peaks of both data and clock transitions are used in a data detection arrangement to generate a reference signal or clock in synchronism therewith, shifted data peaks may be erroneously identified as clock peaks and vice versa leading to a loss of synchronization. At the very least, the shifted peaks require that the synchronization circuitry constantly make adjustments therefor. In the actual detection of the data, shifted "one" peaks may be falsely identified as "zeros" and vice versa. Thus, in detection arrangements which employ pulse gating, "ones" are normally sensed to the exclusion of "zeros" by identifying any peak which occurs within an interval beginning one-quarter of the way through each bit cell and terminating three-quarters of the way through the cell as a "one" and assuming that all other peaks represent "zeros." In such arrangements, "zero" peaks shifted from the leading edges of their bit cells by more than one-quarter of a bit cell length are falsely identified as "ones" while "one" peaks shifted away from the midpoints of their bit cells by more than one-quarter of a bit cell length are assumed to be "zero" peaks.

Figures 1E, 1F:
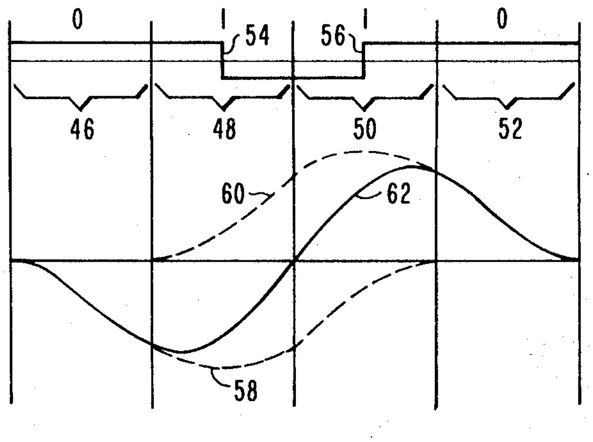

A peak shift problem similar to that illustrated in FIGS. 1C and 1D exists where a pair of adjacent "ones" occurs as in the recording of FIG. 1E which illustrates the data pattern "zero one one zero." The last bit cell 52 does not have a clock transition at the leading edge thereof since it is preceded by the "one" in bit cell 50, and the first bit cell 46 is assumed not to have a clock transition at the leading edge as would be the case if the preceding bit cell were a "one." The "one" or data transitions 54 and 56 at the midpoints of the bit cells 48 and 50 provide signal waveforms 58 and 60, respectively, as shown in dotted outline, and which are combined into a single signal waveform 62, shown in solid outline, by the magnetic read head. Due to the relatively close proximity of the data transitions 54 and 56, the corresponding peaks are extensively shifted to the left and to the right respectively. Again the amount of peak shift shown in FIG. 1F is for purposes of illustration, the amount of peak shift occurring in actual practice being dependent at least in part upon the read head used.

FIGS. 1E and 1F illustrate the peak shift problems involved when a pair of "ones" is surrounded by "zeros" in the data pattern "zero one one zero." This pattern is the most troublesome one involving adjacent "ones" in that the "one" or data transitions are spaced closely to one another yet a substantial distance from the neighboring transitions on the opposite side thereof. The problem is considerably less severe, however, where a succession of three or more "ones" is surrounded by "zeros." In that instance, it has been found that considerably less peak shift occurs, apparently due to the fact that the intermediate data transition or transitions effectively hold the outer data transitions from being shifted too severely by the read head.

FIG. 3A illustrates a modified FM recording for the data pattern "zero one one zero one zero zero zero one." The first four bit cells 70, 72, 74 and 76 contain the data pattern "zero one one zero" illustrated in FIG. 1E, while the remaining five bit cells 78, 80, 82, 84 and 86 contain the data pattern "one zero zero zero one" illustrated in FIG. 1C. It will be appreciated from the previous discussion that the elimination of closely spaced clock transitions in a succession of "zeros" and the elimination of closely spaced data transitions in a pair of "ones" would be highly desirable.

One technique for eliminating substantial peak shift problems in a succession of "zeros" and which involves the writing of a transition at the leading edges of only alternate bit cells within a succession of "zeros" is described in the previously referred to copending application Ser. No. 733,475. The recording which results from the use of this technique is illustrated in FIG. 3B, and will be referred to as modified zero encoding hereafter for convenience. It will be noted that the "one" bit cell intervals 72, 74, 78 and 86 are treated in the same manner as in modified FM by producing a transition at the midpoints thereof. The same rule applies in the case of "-zero" bit cell immediately preceded by a "one" cell, the bit cells 70, 76 and 80 being without a transition at the leading edges thereof as shown in FIG. 3B. Where a succession of three or more "zeros" occurs, however, transitions are written at the leading edges of alternate ones of the cells rather than within each of the cells as in the case of modified FM Since the "zero" bit cell 80 does not have a transition at the leading edge thereof, a transition is written at the edge of the immediately following bit cell 82. Accordingly, the transition at the leading edge of the next "zero" bit cell 84 is not written, thereby avoiding transitions which are spaced apart only by the length of a bit cell in a succession of "zeros." The problem still remains, however, that when the data pattern "zero one one zero" occurs the data transitions at the midpoints of the adjacent "one" cells are spaced closely together leading to the peak shift problems discussed in connection with FIGS. 1E and 1F.

In accordance with the present invention, transitions at the leading edges of alternate bit cells within a succession of "-zeros" are not written as in the case of modified zero encoding. In addition, however, the second "one" in the data pattern "zero one one zero" is dropped during the writing or encoding thereof and later reinserted during decoding or detection of the data, thereby avoiding a pair of closely spaced data transitions. Encoding of the data pattern of FIG. 3A in accordance with the invention results in the waveform of FIG. 3C. It will be noted that the FIG. 3C waveform is the same as that of FIG. 3B for the data pattern "one zero zero zero one" but differs for the pattern "zero one one zero" in that the second "one" is dropped by not writing a transition at the midpoint of bit cell 74.

Figure 2:
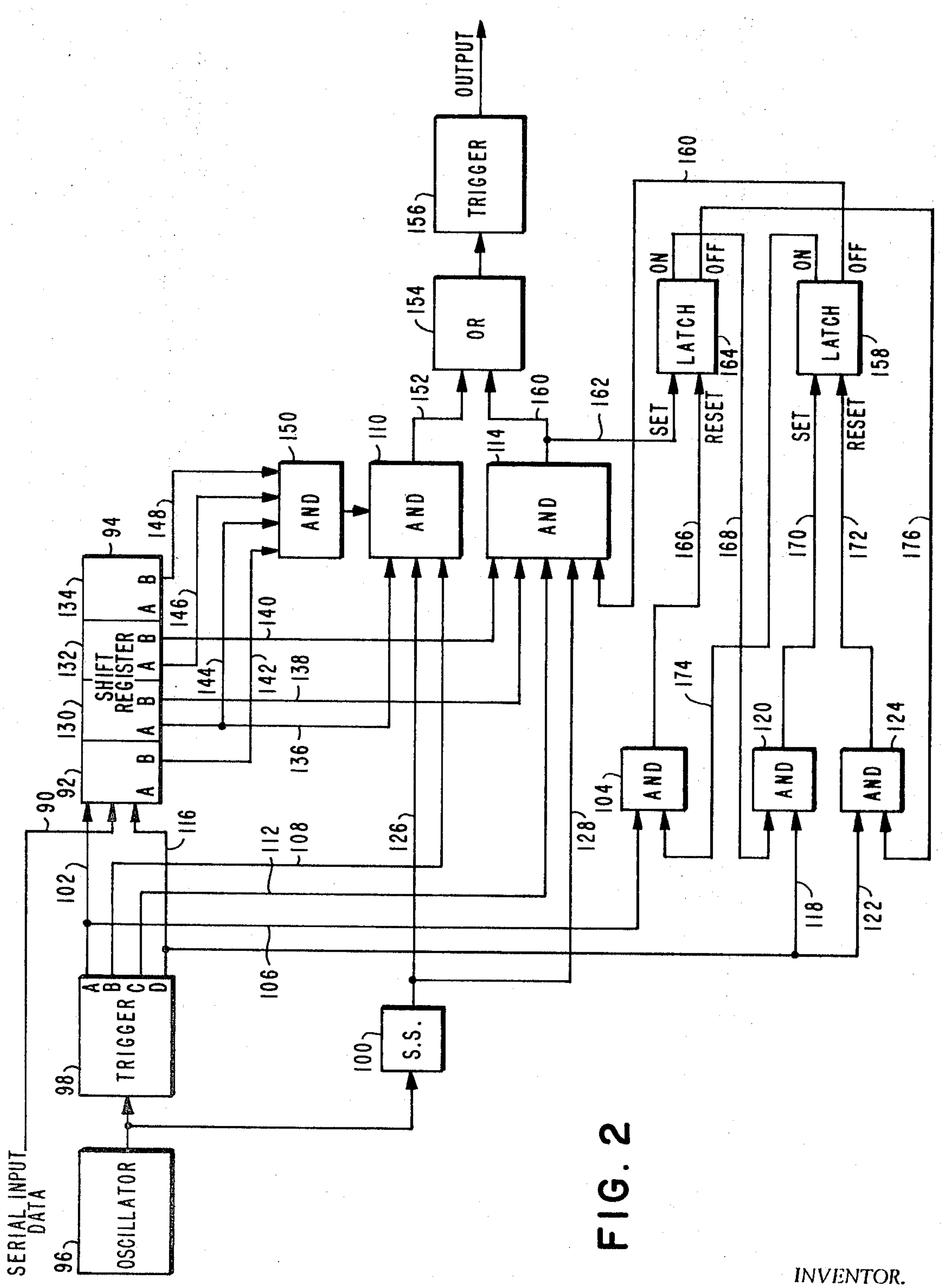
FIG. 2 is a block diagram of one preferred form of an arrangement for encoding binary data in accordance with the invention.

One preferred arrangement for encoding data in accordance with the invention is illustrated in FIG. 2. In FIG. 2, incoming binary data to be recorded or transmitted is applied serially to an input line 90, which transmits the data to a first stage or register 92 of a four-stage shift register 94. The data is advanced through the shift register 94 under the control of timing or clocking circuitry which includes an oscillator 96, a trigger 98 and a single-shot circuit 100. The oscillator 96 produces a square wave at a frequency such that two complete oscillations are undergone for each bit cell. The output of the oscillator 96 as shown in FIG. 3D is supplied to the trigger 98 and to the single-shot circuit 100.

The trigger 98 provides four separate outputs A, B, C and D. Output A comprises a positive pulse for the first quarter of a bit cell as shown in FIG. 3E and is supplied to the shift register 94 via a lead 102 and to an AND-circuit 104 via a lead 106. Output B comprises a positive pulse for the second half of a bit cell as shown in FIG. 3G and is supplied via a lead 108 to one of the inputs of an AND-circuit 110. Output C of the trigger 98 comprises a positive pulse for the first half of each bit cell as shown in FIG. 3H and is supplied via a lead 112 to one of the inputs of an AND-circuit 114. Output D comprises a positive pulse for the third quarter of each bit cell as shown in FIG. 3F and is supplied via a lead 116 to the shift register 94, via a lead 118 to one input of an AND-CIRCUIT 120 and via a lead 122 to one input of an AND-circuit 124.

The single-shot circuit 100 responds to the positive-going transitions of the oscillator 96 to provide short clock and data strobe pulses via a lead 126 to the AND-circuit 110 and via a lead 128 to the AND-circuit 114.

In addition to the first register 92, the shift register 94 includes second, third and fourth registers 130, 132 and 134. Each of the registers 92, 130, 132 and 134 has A and B output terminals, the A output providing a positive signal when a "one" is contained in the register and the B output providing a positive signal when a "zero" is in the register. The A output of the second register 130 is coupled via a lead 136 as one of the inputs of the AND-circuit 110. The B outputs of the registers 130 and 132 are respectively coupled via leads 138 and 140 as two different inputs of the AND-circuit 114. The B, A, A and B outputs of the four registers, 92, 130, 132 and 134 are respectively coupled via leads 142, 144, 146 and 148 as the four inputs of an AND-circuit 150, the output of which is coupled to inhibit the AND-circuit 110 when all four inputs are enabled.

The AND-circuit 110 responds to a "one" in the register 130, via lead 136, and to timing signals from the B output of the trigger 98 and from the single-shot 100, via leads 108 and 126, to transmit data or "one" bits via a lead 152 to an OR-circuit 154 and a trigger 156. The trigger 98 and the single-shot 100 accordingly provide the timing to the AND-circuit 110 for transmitting a data signal when the register 130 contains a "one," except when the registers 92, 132 and 134 contain a "-zero," a "one" and a "zero" respectively.

The AND-circuit 114 is coupled to the B outputs of the registers 130 and 132 via the leads 138 and 140, the C output of the trigger 98 via the lead 112, the output of the single-shot 100 via the lead 128, and the "off" output of a latch 158 via a lead 160. The trigger 98 and the single-shot 100 accordingly provide the timing to the AND-circuit 114 for transmitting a clock signal when the registers 130 and 132 both contain "-zero," and when the latch 158 is off.

Serial input data is first applied to the register 92, and then, under the control of the trigger 98 shifted through the register 130, 132 and 134. Hence, the B output of the register 132 to and AND-circuit 114 prevents transmission of a clock pulse for a "zero" data bit in the register 130 when it immediately follows a "one."

The AND-circuit 110 normally responds to the presence of a "one" in the register 130 to transmit a data pulse to the OR-circuit 154. When the "one" in the register 130 comprises the second "one" of the data pattern "zero one one zero," however, all four inputs to the AND-circuit 150 are enabled to inhibit the AND-circuit 110 and block transmission of a data pulse by the AND-circuit 110 to the OR-circuit 154.

The latch 158 blocks transmission of a clock pulse for a "-zero" in the register 130 which immediately follows a "zero" in the register 132 and which was transmitted as a clock pulse. Clock pulses from the AND-circuit 114 are transmitted via a lead 160 to the OR-circuit 154 and the trigger 156 and also via a lead 162 to "set" a latch 164. The output of the AND-circuit 104 appears on lead 166 to "reset" the latch 164. The "on" output of the latch 164 is transmitted via lead 168 to one input of the AND-circuit 120, the output of which is coupled via a lead 170 to "set" the latch 158. The latch 158 is "reset" by an output from the AND-circuit 124 via a lead 172. The "on" output of the latch 158 enables one input of the AND-circuit 104 via a lead 174, while the "off" output of the latch 158 enables one input of the AND-circuit 114 via the lead 160 as previously mentioned.

Assuming both latch circuits 164 and 158 to be initially off, a clock pulse appearing on lead 162 from the AND-circuit 114 will set the latch 164 on. The "on" output from the latch 164 is passed via the lead 168 to enable one of the inputs of the AND-circuit 120, this occurring at the leading edge of a bit cell. Later in the same bit cell, the D output of the trigger 98 appears on lead 118 and is gated by the AND-circuit 120 to set the latch 158 on. Setting latch 158 on terminates the signal on lead 160 therefrom and thereby blocks the AND-circuit 114 from gating another clock pulse.

The "on" output of the latch 158 is transmitted via lead 174 to enable one of the inputs of the AND-circuit 104. At the beginning of the following bit cell, the A output of the trigger 98 is transmitted on lead 106 and gated by the AND-circuit 104 to lead 166, thereby resetting the latch 164 off. This terminates the signal on the lead 168 thereby blocking the AND-circuit 120. Simultaneously, a signal is transmitted from the "off" output of the latch 164 via a lead 176 to enable one of the inputs of the AND-circuit 124. At the midpoint of that bit cell, the D output of the trigger 98 is transmitted via lead 122 and gated by the AND-circuit 124 over the lead 172 to reset the latch 158 off. This again provides an output on the lead 160 to enable the associated input of the AND-circuit 114 and allow the transmission of a clock pulse to the OR-circuit 154.

As described, the latch 164 controls the operation of the latch 158, and the "off" output of the latch 158 controls the gating or blocking of clock pulses by the AND-circuit 114. Upon the transmission of a clock pulse by the AND-circuit 114 at the beginning of a bit cell, the latches 164 and 158 are operated to turn off the signal on the lead 160 for he last half of that bit cell and the first half of the immediately following bit cell. The blocking of the AND-circuit 114 thereby spans the leading edge of the following bit cell, to thereby block an immediately following clock pulse. The latch circuits are reset after that time to allow the transmission of a clock pulse in the following bit cell, should a "zero" appear in the register 130.

Figures 3K, 3L, 3M, 3N, 3O, 3P, 3Q, 3R, 3S, 3T, 3U:
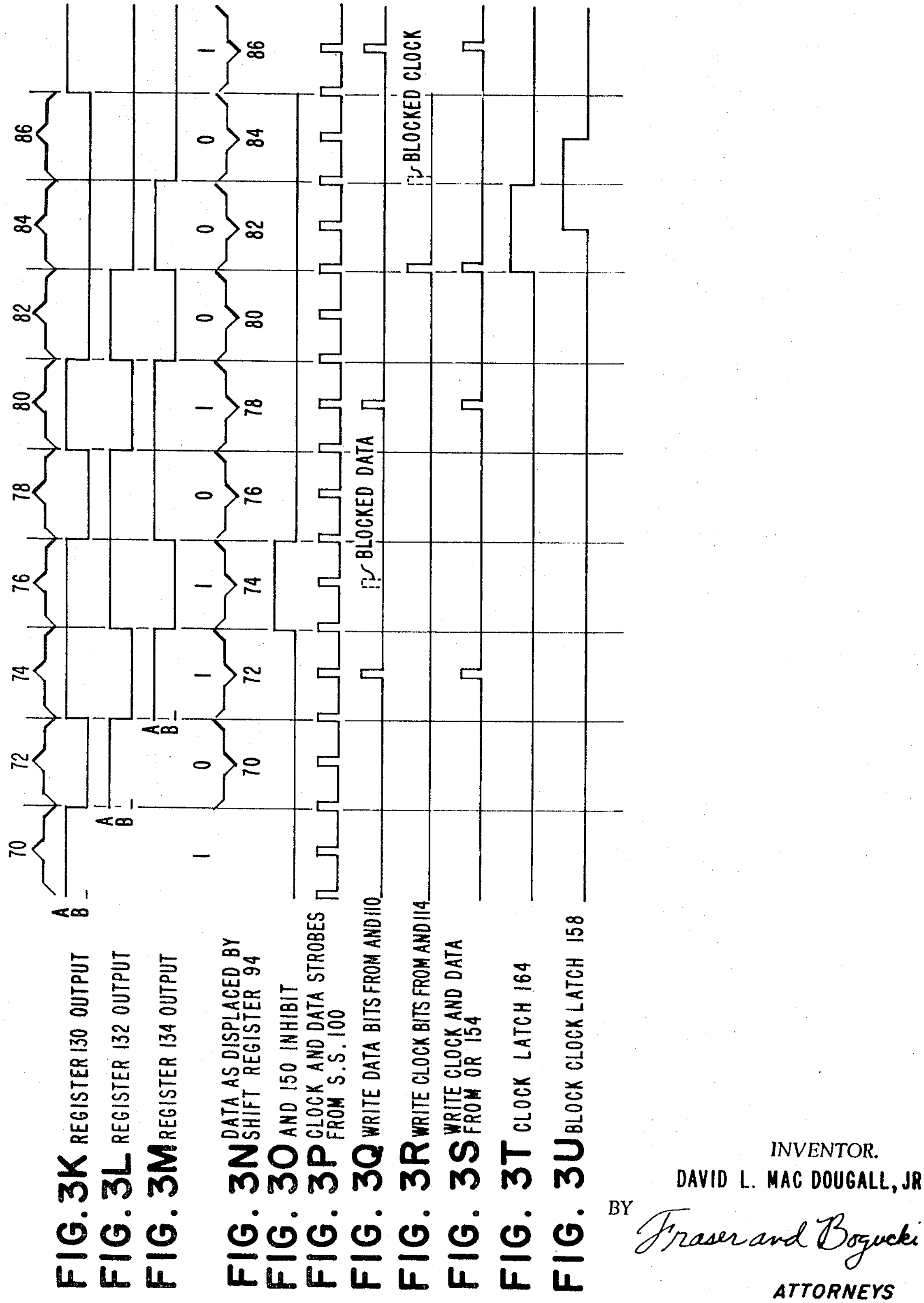

The arrangement of FIG. 2 may be better understood by considering its operation in connection with FIGS. 3D through 3U to provide the data signal shown in FIG. 3C.

The serial input data for the pattern "zero one one zero one zero zero zero one" in FIG. 3 as applied to the input lead 90 is illustrated in FIG. 3I, the data being represented by a signal which assumes a low level during those bit cells representing a "zero" and a high level during those bit cells representing a "one." The first register 92 of the shift register 94 responds to the serial input data to provide A and B outputs as shown by a single waveform in FIG. 3J. When the illustrated waveform is at the higher of its two levels, a signal appears at the A output thereof and no signal appears at the B output thereof. Conversely, when the waveform is at the lower of its two levels indicating that a "zero" is stored in the register, a signal occurs at the B output thereof while no signal appears at the A output. The resulting outputs of the second, third and fourth registers 130, 132 and 134 are respectively illustrated in FIGS. 3K, 3L and 3M. These outputs are the same as that of the first register 92 shown in FIG. 3J except that they are displaced by a number of bit cells equal to the number of register stages by which they are removed from the first register 92, the data stored in each register being advanced to the next register each time a new bit cell is commenced. The second register 130 of the shift register 94 is used to generate the data and clock output bits via the AND-circuits 110 and 114, and accordingly, the encoded output data are delayed one bit cell from the serial input data resulting in a shift by one bit cell of the data pattern as shown in FIG. 3N.

As previously described, the single-shot circuit 100 provides short clock and data strobe pulses to the AND-circuits 110 and 114 during each bit cell, the clock strobes commencing at the leading edge of each bit cell and the data strobes commencing at the midpoint of each bit cell as shown in FIG. 3P. Each data strobe pulse from the single-shot 100 enables one of the three inputs of the AND-circuit 110, a second one of the inputs being enabled during the second half of each bit cell by the B output of the trigger 98. If e third input of the AND-circuit 110 is enabled by a signal from the A output of the register 130, the data strobe pulse is gated by the AND-circuit 110 to the OR-circuit 154 unless inhibited by the AND-circuit 150, such gated data pulses being shown in FIG. 3Q. Two of the five inputs of the AND-circuits 114 comprise the B outputs of the registers 130 and 132. Since a transition at the leading edge of a bit cell representing a "zero" is not written if the cell is immediately preceded by a "one" cell, the two inputs to the AND-circuit 114 from the registers 130 and 132 are not both enabled unless both registers contain a "zero." Assuming that both registers 130 and 132 contain "zeros" the corresponding two inputs to the AND-circuit 114 are enabled throughout the duration of the bit cell. The third input of the AND-circuit 114 is enabled during the first half of the bit cell by the C output of the trigger 98 shown in FIG. 3H. The clock strobe pulse from the single-shot 100 at the fourth input of the AND-circuit 114 will therefore be gated to the OR-circuit 154 so long as the fifth input of the AND-circuit 114 is enabled by an "off" signal by the latch 158. The pulses gated by the AND-circuit 114 are shown in FIG. 2R. These pulses are combined with those from the AND-circuit 110 in the OR-circuit 154 to provide the pulse train shown in FIG. 3S.

As previously mentioned, the absence of an "off" output from the latch 158 prevents the gating of a "zero" or clock pulse by the AND-circuit 114 when a clock pulse was generated in the immediately preceding bit cell. The latch 164 which is normally off is set on by each generated clock pulse from the AND-circuit 114, the output of the latch 164 being illustrated in FIG. 3T, where the lower level of the waveform represents "off" and the upper level represents "on." The setting of the latch 164 on operates to set the latch 158 on during the second half of the bit cell and the first half of the immediately following bit cell as previously described. The output of the latch 158 is illustrated in FIG. 3U wherein the lower level of the illustrated waveform represents "off" and the upper level represents "on."

Referring to FIG. 3Q, it will be noted that data strobe pulses are gated by the AND-circuit 110 to the OR-circuit 154 during the bit cells 72, 78 and 86 to represent the "ones" in these cells. During the bit cell 74, all three inputs of the AND-circuit 110 are enabled, but output signals appear at the B, A, A and B outputs of the registers 92, 130, 132 and 134 respectively to enable all four inputs of the AND-circuit 150 and provide an inhibit signal at the output thereof as shown in FIG. 30. The output of the AND-circuit 150 inhibits the AND-circuit 110 preventing the generation of data bit corresponding to the second "one" in the data pattern "zero one one zero." As previously discussed, the deletion of this second "one" avoids the closely spaced pair of adjacent "one" transitions substantially reducing the peak shift problems which would otherwise be present. During reading, the missing "one" in the data pattern "zero one one zero" is reinserted in a manner to be described in connection with the detection arrangement of FIG. 4.

During the bit cell 70, no signal appears at the B output of the third register 132 as shown in FIG. 3L, and the corresponding input to the AND-circuit 114 is accordingly not enabled preventing the generation of a clock strobe pulse as shown in FIG. 3R. The generation of a clock strobe pulse in the bit cells 76 and 80 is similarly prevented since each of these cells is preceded by a cell in which a "one" is present. At the start of the bit cell 82, all five inputs of the AND-circuit 114 are enabled and the clock strobe pulse is gated to the OR-circuit 154 as shown in FIG. 3R. This clock pulse sets the latch 164 on during the bit cell 82 as shown in FIG. 3T. The "on" signal at at output of the latch 164 appears at one of the inputs of the AND-circuit 120 and is gated to set the latch 158 on at the midpoint of the bit cell 82 when the D output of the trigger 98 enables the other input of the AND-circuit 120. As shown in FIG. 3U, the output of the latch 158 remains "on" until the midpoint of the next bit cell 84. At the beginning of the bit cell 84, the A output of the trigger 98 enables the AND-circuit 104 to pass the "on" output signal from the latch 158 to reset the latch 164 off as shown in FIG. 3T. The signal from the "off" output of the latch 164 enables one input of the AND-circuit 124, the other of which is enabled at the midpoint of the bit cell 84 by the D output of the trigger 98 to reset the latch 158 off and enable the associated input of the AND-circuit 114 via the lead 160. If the next bit cell 86 represented a "zero" instead of a "one," a clock strobe pulse would be gated by the AND-circuit 114 to the OR-circuit 154 and the latches 164 and 158 would both be set on to block the gating of a clock strobe pulse at the leading edge of the following bit cell, should the following bit cell represent a "zero."

It ill be seen that the latches 164 and 158 and the associated circuitry operate to block alternate clock pulses within a succession of "zeros" preventing closely spaced transitions in a succession of "zeros" As previously discussed, the elimination of alternate "zero" or clock pulses substantially reduces the peak shift problems which would otherwise be present. As will be seen from the discussion of the detection arrangement of FIG. 4 to follow, the absence of transitions or pulses at the leading edges of alternate "zero" bit cells makes no difference as far as detection of the data is concerned since all bit cells having a transition or pulse at the midpoint thereof are identified as representing a "one" and all other bit cells are assumed to be "zero" unless they are the third cell in the "zero one one zero" pattern.

As shown in FIG. 3S, the OR-circuit 154 combines the data pulses of FIG. 3Q and the clock pulses of FIG. 3R into a single pulse train for appropriate communication of the binary data. Where the data is to be recorded on a magnetic medium, the various pulses at the output of the OR-circuit 154 are applied to alternately switch the trigger 156 between its stable states producing the signal shown in FIG. 3C. A magnetic head is used to record on the magnetic medium and responds to the signal of FIG. 3C by reversing the sense of magnetization at each of the transitions thereof.

Figure 4A:
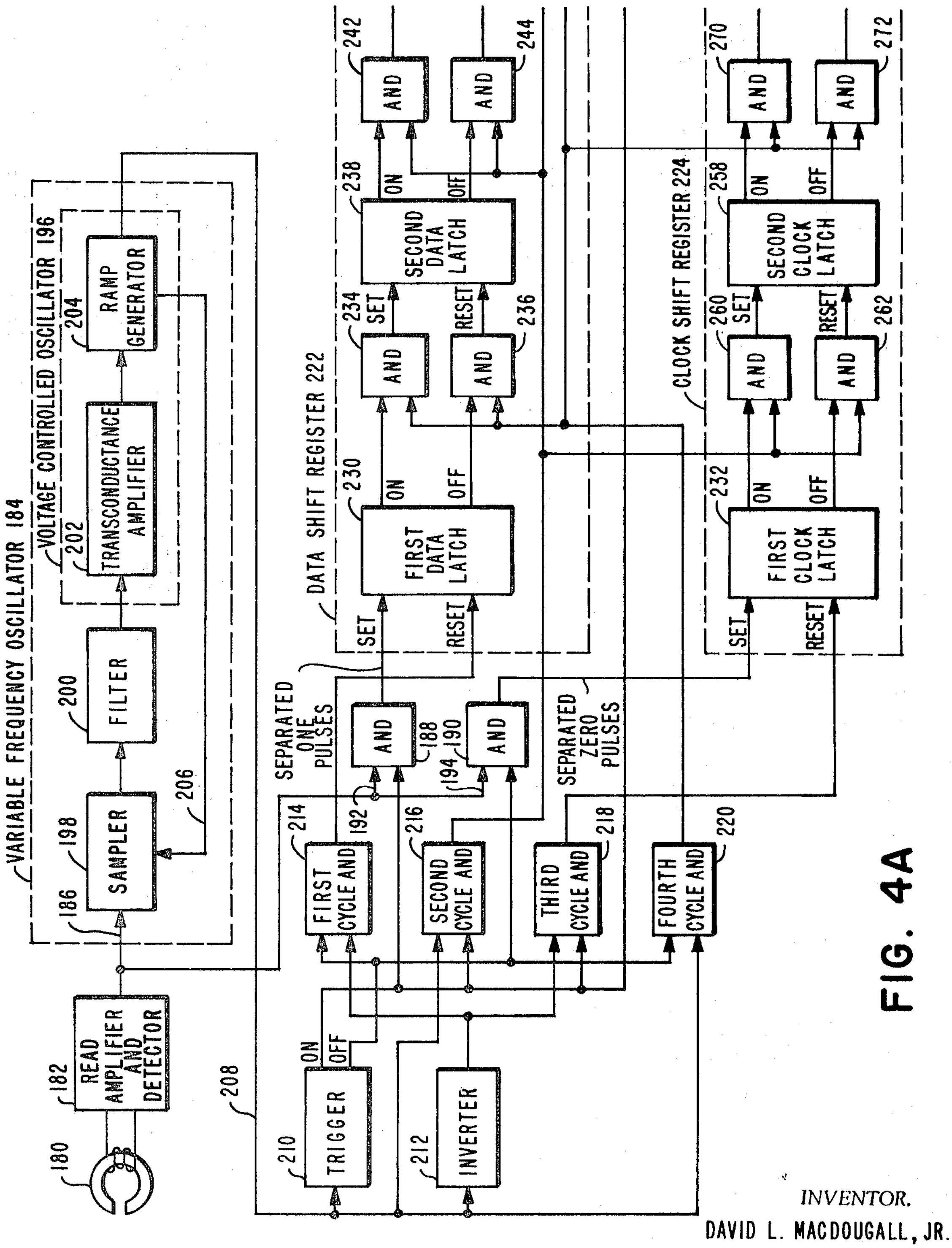
FIG. 4 is a block diagram, comprising FIGS. 4A and 4B interconnected as shown in FIG. 4C, of one preferred form of an arrangement for detecting encoded binary data in accordance with the invention.
Figure 4C:
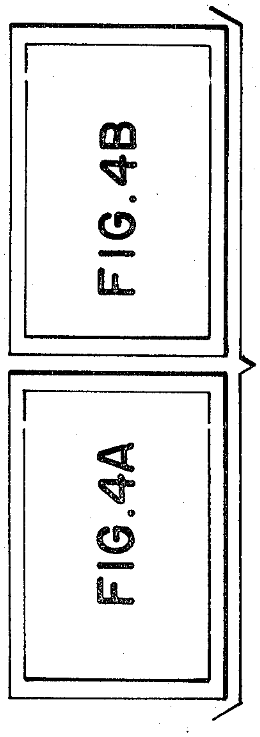
Figure 4B:
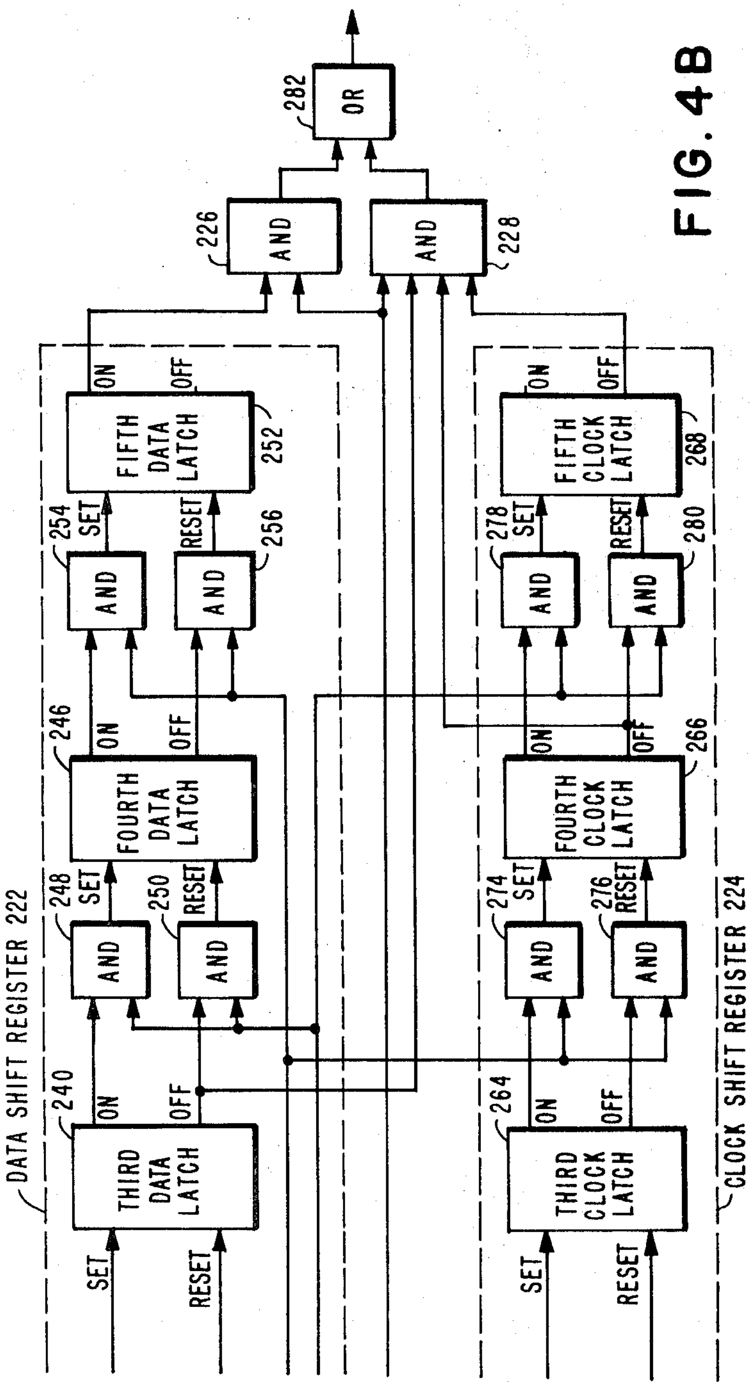

One preferred arrangement for detecting data recorded or transmitted by the arrangement of FIG. 2 is illustrated in FIG. 4 with corresponding waveforms shown in FIGS. 5A through 5V. For purposes of illustration, it is assumed that the data has been recorded in the form shown in FIG. 5A and that a magnetic read head 180 is used to derive the recorded signal therefrom.

A read amplifier and detector 182 responds to the signal derived by the head 180 by filtering out high-frequency noise signals and responding to the transitions of the recorded signal to provide a narrow, positive-going pulse at the point of each transition as shown in FIG. 5B. These pulses, which may be referred to as raw data, are supplied to a variable-frequency oscillator 184 via a lead 186, and to one input of a pair of AND-circuits 188 and 190 via leads 192 and 194 respectively.

The variable-frequency oscillator 184 responds to the exact position of the detected transitions with respect to bit cell boundaries as defined by a voltage-controlled oscillator 196. The variable-frequency oscillator 184 adjusts the frequency and phase of the voltage-controlled oscillator 196 as necessary to maintain the clocking output signal of the variable-frequency oscillator is synchronism with the bit cells of the detected transitions.

The variable-frequency oscillator 184 includes the voltage-controlled oscillator 196, a sampler 198 and a filter 200. The voltage-controlled oscillator 196 includes a transconductance amplifier 202 and a ramp generator 204. The ramp output of the generator 204 which is supplied to the sampler 198 via a lead 206 and which is illustrated in FIG. 5C comprises a vertical transition from negative to positive polarity, followed by a sloping transition from positive to negative polarity. The positive-going transitions occur at points one-quarter and three-quarters of the distance along each bit cell. The pulse output from the ramp generator 204, which is applied via a lead 208 to a trigger 210, an inverter 212 and the second and fourth AND-circuits of four different AND-circuits 214, 216, 218 and 220, comprises pulses during the second and fourth quarters of each bit cell as shown in FIG. 5D.

If the voltage-controlled oscillator 196 is exactly synchronized in frequency and phase with the incoming bit cells, the midpoints of the sloped ramp signals are exactly aligned with the midpoints and leading edges of the bit cells. To continually test the synchronization, the ramp output from the generator 204 and the incoming raw data are supplied to the sampler 198 which responds to the phase of the incoming raw data and transmits to the filter 200 the instantaneous voltage of the ramp at the time the raw data pulse is received. Thus, if a raw data bit is received at exactly the midpoint of the ramp, the sampler 198 provides a zero output voltage. If, however, the raw data bit arrives slightly before the midpoint of the ramp, the sampler provides a small positive voltage. The further the raw data bits precede the midpoint of the sloped ramp signal, the greater is the voltage output of the sampler 198. Similarly, if the raw data bit is received by the sampler 198 after the midpoint of the sloped ramp signal, a negative voltage is supplied to the filter 200. The filter 200 smooths the output of the sampler 198 so that sudden changes are severely attenuated, and supplies a smooth signal to the transconductance amplifier 202. The transconductance amplifier 202 responds to the smooth output of the filter 200 to supply an error current corresponding to the error voltage of the filter 200 to control the frequency of the ramp generator 204. The voltage-controlled oscillator 196 is arranged to speed up in response to a positive error voltage from the filter 200 and to slow down in response to a negative error voltage.

Hence, a difference between the time of receipt of a raw data bit and the midpoint of the sloped portion of the ramp signal is linearly translated into a voltage by the sampler 198, converted into a current by the transconductance amplifier 202, and supplied to the ramp generator 204 to change the speed thereof so that the variable-frequency oscillator 184 gradually moves into more exact synchronism with the bit cells of the received recorded signals.

The AND-circuits 214, 216, 218 and 220 function in combination with the trigger 210 and inverter 212 and the AND-circuits 188 and 190 to separate the "one" pulses from the "-zero" pulses and to advance data and clock shift registers 222 and 224 coupled to respectively receive the separated "one" and "zero" pulses. The "on" output of the trigger 210, which is shown in FIG. 5E and which comprises a pulse during the center half of each bit cell, is applied as an input of the AND-circuits 188, 216, and 218 as an input of a pair of AND-circuits 226 and 228 at the outputs of the data and clock shift registers 222 and 224. The complementary "off" output of the trigger 210 is applied to the AND-circuits 214, 190 and 220. The pulse signal from the ramp generator 204 as inverted by the inverter 212 is applied as the second input of the AND-circuit 214 and the AND-circuit 218.

During the first quarter of each bit cell, signals are simultaneously present at the "off" output of the trigger 210 and the inverter 212 resulting in a pulse at the output of the first-cycle AND-circuit 214 as shown in FIG. 5F. The "on" output signal from the trigger 210 combines with the pulse output of the ramp generator 204 during the second quarter of each bit cell to provide a pulse at the output of the second-cycle AND-circuit 216 as shown in FIG. 5G. During the third quarter of each bit cell, the pulse signal from the ramp generator 204 as inverted by the inverter 212 combines with the "on" output of the trigger 210 in the third-cycle AND-circuit 218 to provide an output pulse as shown in FIG. 5H. During the fourth quarter of each bit cell, the pulse signal from the ramp generator 204 is applied to the fourth-cycle AND-circuit 220 along with the "off" output of the trigger 210 to provide a pulse as shown in FIG. 5I. It will be noted from an inspection of FIGS. 5F through 5I that the outputs of the AND-circuits 214, 216, 218 and 220 comprise pulses which sequentially occur during the first, second, third and fourth quarters of each bit cell. As will become more fully apparent from the discussion to follow, these pulses are used to advance the data and clock shift registers 222 and 224.

The "on" and "off" outputs of the trigger 210 are also used in conjunction with the AND-circuits 188 and 190 to separate the "one" and "zero" pulses which appear at the output of the read amplifier and detector 182. The "on" output of the trigger 210 enables the AND-circuit 188 during the center half of each bit cell to pass "one" pulses occurring during this interval to the "set" input of a first data latch 230 in the data shift register 222, the separated "ones" at the output of the AND-circuit 188 being illustrated in FIG. 5J. The "off" output of the trigger 210 enables the AND-circuit 190 during the first and last quarters of each bit cell to gate "zero" pulses to the "-set" input of a first block latch 232 in the clock shift register 224, the separated "zeros" at the output of the AND-circuit 190 being shown in FIG. 5K.

The first data latch 230 within the data shift register 222 is "set" by each separated "one" pulse and "reset" at the beginning of each bit cell by the output of the first-cycle AND-circuit 214 as shown in FIG. 5L. The "on" and "off" outputs of the first data latch 230 are coupled to respectively enable one input of a pair of AND-circuits 234 and 236 at the "set" and "reset" inputs of a second data latch 238, the other input of the AND-circuits 234 and 236 being enabled by the output of the fourth-cycle AND-circuit 220 during the last quarter of each bit cell. The data shift register 222 additionally includes a third data latch 240 with associated AND-circuits 242 and 244 at its "set" and "reset" inputs, a fourth data latch 246 with AND-circuits 248 and 250 at its inputs, and a fifth data latch 252 with AND-circuits 254 and 256 at its inputs. The AND-circuits 242 and 244 at the inputs of the third data latch 240 as well as the AND-circuits 254 and 256 at the inputs of the fifth data latch 252 are coupled to have one input thereof enabled during the second quarter of each bit cell by the output of the second-cycle AND-circuit 216. Like the AND-circuits 234 and 236 at the inputs of the second data latch 238, the AND-circuits 248 and 250 at the inputs of the fourth data latch 246 are coupled to be enabled during the fourth quarter of each bit cell by the output signal from the fourth-cycle AND-circuit 220. Accordingly, each "one" which is entered in the first data latch 230 is shifted into the second data latch 238 at the beginning of the fourth quarter of the bit cell as shown in FIG. 5M. Thereafter, the stored "one" is advanced to the third, fourth and fifth data latches 240, 246 and 252 at one-half bit cell intervals as shown in FIGS. 5N, 5O and 5P.

The clock shift register 224 is arranged and operates in a manner similar to the data shift register 222 to store and advance "zero" or clock pulses. Each "zero" bit stored in the first clock latch 232 is advanced to a second clock latch 258 via AND-circuits 260 and 262 at the beginning of the second quarter of the next bit cell after it occurs as shown in FIG. 5R, and thereafter to third, fourth and fifth clock latches 264, 266 and 268 via associated AND-circuits 270, 272, 274, 276, 278 and 280 at one-half bit cell intervals as shown in FIGS. 5S, 5T and 5U.

As previously mentioned, the dropping of transitions at the leading edges of alternate bit cells within a string of "zeros" does not change the read process since the separated "one" pulses are considered to the exclusion of "zero" pulses or the absence thereof. Accordingly, "ones" at the output of the data shift register 222 as represented by the "on" condition of the fifth data latch 252 are gated through the AND-circuit 226 by the "on" signal from the trigger 210 and passed through an OR-circuit 282, the output of which is illustrated in FIG. 5V. "Zero" bits are represented by an "off" output from the fifth data latch 252 in which case the fifth clock latch 268 may be either "on" or "off" depending upon whether or not a clock pulse was present at the leading edge of the bit cell. In either event, the "zero" bit is not passed to the output. Where the second "one" has been dropped in the data pattern "zero one one zero," however, it is necessary to reinsert the missing "one," and this is accomplished by the AND-circuit 228. As was previously noted, the dropping of the second "one" in the pattern "zero one one zero" results in two adjacent bit cells which have neither a "one" nor a "zero" pulse therein. This condition is sensed by the AND-circuit 228, which has one input coupled to be enabled during the center half of each bit cell by the "on" output of the trigger 210 and three additional inputs coupled to the "off" outputs of the third data latch 240, the fourth clock latch 266 and the fifth clock latch 268. As shown in FIG. 5B, the adjacent bit cells 74 and 76 are without any pulses at the centers or leading edges thereof, and the AND-circuit 228 responds to this condition to insert a "one" in the bit cell 74 as shown in FIG. 5V. It will also be noted from FIG. 5V that the data and clock shift registers 222 and 224 delay the output data by two full bit cells relative to the raw input data.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of communicating binary information as identifiable signal indicia within a succession of arbitrarily defined bit cell intervals comprising the steps of:

communicating one binary characterization in selected ones of the bit cell intervals by producing a signal indicium at the midpoint of only those of the selected bit cell intervals not communicated immediately following a pair of bit cell intervals having the one binary characterization and the other binary characterization therein and immediately before a bit cell interval which is to have the other binary characterization therein;

communicating the other binary characterization in bit cell intervals other than said selected ones by producing a signal indicium at the leading edge of only those of said other bit cell intervals not communicated immediately following a bit cell interval having a signal indicium therein;

identifying the communicated bit cell intervals having a signal indicium at the midpoint as representing the one binary characterization;

identifying the communicated bit cell intervals having a signal indicium at the leading edge as representing the other binary characterization;

identifying the communicated bit cell intervals which do not have a signal indicium and which are communicated immediately following a bit cell interval having a signal indicium therein as representing the other binary characterization; and identifying the communicated bit cell intervals which do not have a signal indicium and which are communicated immediately before a bit cell interval which does not have a signal indicium as representing the one binary characterization.

2. A method of encoding binary "ones" and "zeros" on a communication medium and thereafter detecting the "ones" and "zeros" from the communication medium, the communication medium exhibiting two separately identifiable states and being considered to be arbitrarily divided into a plurality of nearly uniform bit cells, comprising the steps of:

producing a transition between the separately identifiable states at the midpoint of each bit cell which is to represent a "one" except where the bit cell is immediately preceded by a pair of bit cells representing "zero one" and immediately followed by a bit cell which is to represent a "-zero";

producing a transition between the separately identifiable states at the leading edge of each bit cell which is to represent a "zero" except where the bit cell is immediately preceded by a bit cell having a transition at the leading edge or the midpoint thereof;

detecting those bit cells which have a transition at the midpoint and identifying the detected bit cells as representing a "one";

detecting those bit cells which have a transition at the leading edge and identifying the detected bit cells as representing a "zero";

identifying the remaining bit cells which do not have a transition at the leading edge or the midpoint as representing a "zero" unless the bit cell is followed by a bit cell which does not have a transition at the leading edge or the midpoint; and identifying the remaining bit cells which do not have a transition at the leading edge or the midpoint and which are followed by a bit cell which does not have a transition at the leading edge or the midpoint as a "one."

3. The method of claim 2, wherein:

the communication media is initially in one of the two, separately identifiable states; and the direction of each of the produced transitions is from the one of the separately identifiable states the medium is in immediately prior to the transition, to the other separately identifiable state.

4. The method of claim 2, wherein:

the communication medium comprises a magnetic recording medium which exhibits a hysteresis characteristic having two stable states of remanence and which is considered to be arbitrarily arranged into at least one lineal track, each track being considered as comprising a succession of contiguous bit cells of nearly uniform length; and the producing of a transition between the separately identifiable states of the communication medium comprises imposing a magnetic field upon said magnetic recording medium to first impress one of said remanent states upon the medium, moving said magnetic field longitudinally along said track, and changing the direction of said magnetic field to cause the medium to undergo a transition at the point of change to the other of said remanent states.

5. A system for processing binary information for communication on a medium having two, separately identifiable states, comprising:

a source of binary information;

clocking means for forming a plurality of bit cells of substantially uniform time durations;

logic means responsive to the binary information from the source and to the clocking means to provide an output on said medium such that one bit of binary information is communicated in each of said bit cells, said output responding to those of said bits of one binary characterization by providing a transition between said separately identifiable states at the midpoint of each corresponding bit cell except where the bit cell is immediately preceded by a pair of bit cells containing bits of the other binary characterization and the one binary characterization and immediately followed by a bit cell containing a bit of the other binary characterization, and responding to those of said bits of the other binary characterization by providing a transition between said separately identifiable states at the leading edge of only those of the corresponding bit cells which immediately follow a bit cell having no transition therein; and means for recovering said binary information from said output by responding to said transitions to detect the boundaries of said bit cells, said recovering means responding to those of said transitions occurring at the midpoint of a bit cell to detect said one binary characterization in each such bit cell and to those of said transitions occurring at the leading edge of a bit cell to detect said other binary characterization in each such bit cell, said recovering means further responding to those bit cells without a transition at the midpoint or leading edge thereof and to the immediately preceding bit cell to detect said other binary characterization when the immediately preceding bit cell contains a transition and to detect said one binary characterization when the immediately preceding bit cell is absent a transition.

6. A system in accordance with claim 5, wherein said logic means additionally comprises:

first blocking means responsive to a succession of four bit cells in which the outer two bit cells are to represent the other binary characterization and the inner two bit cells are to represent the one binary characterization for preventing the occurrence of an output transition in the second inner bit cell;

storage means for indicating whether the output provided for the immediately preceding bit cell contained a transition therein; and second blocking means responsive to said storage means for preventing the occurrence of output transitions in those of said bit cells corresponding to said other binary characterization which immediately follow a bit cell having a transition therein.

7. In a system in which binary information is communicated in the form of transitions between two separately identifiable states of,a communication medium within a succession of substantially uniform bit cells thereof, those bit cells which have a transition substantially at the midpoint thereof representing a "one" bit, those bit cells which have a transition substantially at the leading edge thereof representing a "zero" bit, and those bit cells which do no include a transition representing a "zero" bit if the immediately following bit cell includes a transition and a "one" bit if the immediately following bit cell does not include a transition, an arrangement for detecting the communicated binary data comprising:

means responsive to the communication medium for generating separate sets of "one" and "zero" pulses in coincidence with the transitions at the midpoints an leading edges of the bit cells respectively;

first shift register means having a plurality of stages and responsive to the "one" pulses to store a representation of the presence or absence of a "one" pulse in each bit cell;

second shift register means having a plurality of stages and responsive to the "zero" pulses to store a representation of the presence or absence of a "zero" pulse in each bit cell;

output means coupled to the first shift register means to receive a representation of each "one" pulse advanced through the first shift register means; and means responsive to selected stages in the first and second shift register means for providing a "one" representation to the output means whenever the selected stages simultaneously assume predetermined states.

8. An arrangement in accordance with claim 7, wherein the means for generating separate sets of "one" and "zero" pulses includes:

means responsive to each transition of the communication medium for generating a pulse in coincidence therewith;

means responsive to the generated pulses for generating a reference signal in synchronism therewith;

first gating means responsive to the reference signal and to the generated pulses for passing those pulses which occur during the center portion of each bit cell to the first shift register means; and second gating means responsive to the reference signal and to the generated pulses for passing those pulses which occur at the opposite edge portions of each bit cell to the second shift register means.

9. A method of communicating one of two different characterizations of binary information as identifiable signal indicia within a succession of arbitrarily defined bit cell intervals comprising the steps of:

communicating the one binary characterization in selected ones of the bit cell intervals by producing a signal indicium at the midpoint of only those of the selected bit cell intervals not communicated immediately following a pair of bit cell intervals having the one binary characterization and the other binary characterization therein and immediately before a bit cell interval which is to have the other binary characterization therein;

identifying the communicated bit cell intervals having a signal inidicium at the midpoint as representing the one binary characterization; and identifying the communicated bit cell intervals which do not have a signal indicium and which are communicated immediately before a bit cell interval which does not have a signal indicium as representing the one binary characterization.

10. In a system in which one of two different characterizations of binary information is communicated within selected ones of a succession of arbitrarily defined bit cell intervals by producing a signal indicium at the midpoint of each of the selected ones of the bit cell intervals except where the selected bit cell interval follows a pair of bit cell intervals having the one binary characterization and the other binary characterization therein and precedes a bit cell interval which is to have the other binary characterization therein, an arrangement for detecting the communicated one binary characterization comprising:

means responsive to those bit cell intervals having a signal indicium at the midpoint for identifying each such bit cell interval as representing the one binary characterization; and means responsive to those bit cell intervals which do not have a signal indicium at the leading edge or the midpoint and which are followed by a bit cell interval which does not have a signal indicium at the leading edge or the midpoint for identifying each such bit cell interval as representing the one binary characterization.

* * * * *